(12) United States Patent
Khalil et al.

(10) Patent No.: US 6,751,672 B1
(45) Date of Patent: Jun. 15, 2004

(54) EFFICIENT DYNAMIC HOME AGENT DISCOVERY ALGORITHM AND SYSTEM

(75) Inventors: Mohamed Khalil, Dallas, TX (US); Emad Qaddoura, Plano, TX (US); Haseeb Akhtar, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/324,323

(22) Filed: Jun. 2, 1999

(51) Int. Cl.$^7$ .......................... G06F 15/16; G06F 11/00
(52) U.S. Cl. ...................... 709/230; 709/201; 709/220; 714/4; 379/219; 379/309
(58) Field of Search ................ 709/202, 230, 709/204, 206, 220, 221, 201; 714/4; 379/219, 202.01, 309

(56) References Cited

U.S. PATENT DOCUMENTS

| | | | | |
|---|---|---|---|---|
| 5,799,154 A | * | 8/1998 | Kuriyan | 709/223 |
| 6,012,095 A | * | 1/2000 | Thompson et al. | 709/231 |
| 6,195,705 B1 | * | 2/2001 | Leung | 709/245 |
| 6,430,698 B1 | * | 8/2002 | Khalil et al. | 714/4 |

OTHER PUBLICATIONS

Shen Zhen Hua et al., National University of Singapore Centre For Wireless Communications, "Proposals For Dynamic Home Discovery In Mobile IPv6", dated Mar. 1999, pp 1–10.*

Johnson, The Monarch Project, Carnegie Mellon University, "Changes In The Latest Mobile IPv6 Draft", dated Aug. 1998, pp 1–8.*

Chambless et al., "Home Agent Redundancy Protocol", dated Oct. 1997, pp 1–15.*

IETF: RFC 2003, "IP Encapsulation Within IP", C. Perkins, dated Oct. 1996, pp 1–14.*

Zhen Hua Shen, Winston Shea & Anthony Lo, "Enhancements to Dynamic Home Agent Discovery", Internet Draft (draft-shen-mobileip-ipv6-ha-discov-00.txt), pp. 1–10, Feb. 1999, XP002253906 IETF Draft, National University of Singapore.

David B. Johnson & Charles Perkins, "Mobility Support in Ipv6", Internet Article, Nov. 18, 1998, XP002253905 IETF Mobile IP Working Group, URL:http://www.waterspring-s.org/pub/id/draft–ietf–mobileip–ipv6–07.txtm, pp. 1–93.

Charles E. Perkins, "Mobile Networking Through Mobile IP", IEEE Internet Computing, IEEE Service Center, Piscataway, NJ, US, vol. 2, No. 1, 1998, pp. 58–69, XP–000764776, Jan.–Feb. 1998.

(List continued on next page.)

*Primary Examiner*—Jack B. Harvey
*Assistant Examiner*—Lambert Tran
(74) *Attorney, Agent, or Firm*—John D. Crane; Dillon & Yudell LLP

(57) ABSTRACT

An efficient and improved dynamic home agent discovery algorithm and system to be used in a protocol for network communications. The present invention encapsulates and integrates communications of the home agents into a single home agent communication. Communication between a mobile node and the home agents is simplified to a single home agent communication. Dynamic home agent discovery processes are performed, based on the single home agent communication. Encapsulation is achieved by having each of the home agents maintain a home agent list that contains information about each of the home agents coupled to the home link. A designated home agent receives and processes home agent discovery requests from the mobile node on behalf of home agents coupled to the home link, and a designated home agent sends home agent advertisements to and communicates with the mobile node.

21 Claims, 8 Drawing Sheets

OTHER PUBLICATIONS

Jason P. Jue & Dipak Ghosal, "Design and Analysis of Replicated Servers to Support IP–Host Mobility in Enterprise Networks", Communications, 1997, ICC '97 Montreal, Towards the Knowledge Millennium, 1997 IEEE International Conference on Montreal, Que., Canada Jun. 8–12, 1997, New York, NY, USA, IEEE, US, Jun. 8, 1997, pp. 1256–1260, XP010226957.

C. Perkins, (Editor), "IP Mobility Support, RFC 2002", Internet Article, Oct. 1996, XP002233555, URL:http://www.faqs.org/rfc/rfc2002.htm.

Samrat Bhattacharjee et al., "Application–Layer Anycasting", Networking and Telecommunications Group, College of Computing, Georgia Institute of Technology, Atlanta, GA, Apr. 7, 1997, pp. 1388–1396, XP010251961.

* cited by examiner

Dynamic Home Agent Discovery Process

EFFICIENT DYNAMIC HOME AGENT DISCOVERY ALGORITHM AND SYSTEM

BACKGROUND OF THE INVENTION

1. Technical Field

The present invention relates in general to a home agent discovery algorithm and system for a computer protocol and in particular to an efficient and improved dynamic home agent discovery algorithm and system for a computer protocol that provides efficient communications and utilization of resources between a mobile computer system or device and other systems and devices, especially when the mobile computer system or device has moved from one location to another location.

2. Description of the Related Art

Computers or computer systems/devices that communicate with each other over the Internet and a home network require the use of a protocol or Internet protocol (IP). FIG. 1 is a prior art figure of a mobile computer 10 in communications with a home network 12 at one location which is moved to another location that is in communications to the Internet 14. The configuration in FIG. 1 requires a base mobile Internet protocol (IP) for providing and routing communications between computer systems and devices, especially when the mobile computer 10 has moved from one location to another location (i.e. moved from being in communication with the home network 12 to being in communication with the Internet 14). Current protocols require the use of dynamic home agent discovery algorithms in order for the mobile node 11 to discover the IP address of its home agent 16. However, inefficiencies and problems exist with current protocols, such as the base mobile Internet protocol (IP), that use present dynamic home agent discovery algorithms.

In discussing these protocols that use dynamic home agent discovery algorithms, the following terms are generally defined:

"Mobile Node" is a host or router that changes its point of attachment from one network or sub-network to another network or sub-network. A mobile node may change its location without hanging its IP address, and it may continue to communicate with other Internet nodes at any location using its (constant or fixed) IP address, assuming link-layer connectivity to a point of attachment is available.

"Home Agent" is a router on a mobile node's home network which tunnels datagrams for delivery to the mobile node when it is away from home and maintains current location information for the mobile node. The home agent has three main operations: 1) sending agent advertisement; 2) receiving a home agent discovery request and processing the discovery request; 3) receiving a registration request and processing the registration request.

"Foreign Agent" is a router on a mobile node's visited network, which provides routing services to the mobile node while registered. The foreign agent detunnels and delivers datagrams to the mobile node that were tunneled by the mobile node's home agent. For datagrams sent by a mobile node, the foreign agent may serve as a default router for registered mobile nodes.

"Agent Advertisement" is an advertisement, message constructed by attaching a special Extension to a router advertisement message.

"Care-of Address" is the termination point of a tunnel toward a mobile node, for datagrams forwarded to the mobile node while it is away from home. The protocol is able to use two different types of care-of address: a "foreign agent care-of address" is an address of a foreign agent with which the mobile node is registered and a "co-located care-of address" is an externally obtained local address which the mobile node has associated with one of its own network interfaces.

"Correspondent Node" is a peer which is communicating with a mobile node. A correspondent node may be either mobile or stationary.

"Home Address" is an IP address, that is assigned for an extended period of time to a mobile node. It remains unchanged regardless of where the node is attached to the Internet.

"Home Network" is a network, possibly virtual, having a network prefix matching that of a mobile node's home address. Standard IP routing mechanisms will deliver datagrams destined to a mobile node's Home Address to the mobile node's Home Network.

"Link" is a facility or medium over which nodes are able to communicate at the link layer. A link underlies the network layer.

"Mobility Agent" is either a home agent or a foreign agent.

"Mobile Node's Failure Recovery Information" is the minimal amount of information required to recover the mobile node's operation if its serving home agent failed. The mobile node's failure recovery information should contain at least a mobile node's care-of address, mobile node's home IP address, registration lifetime, and registration flags.

"All Home Agents Multicast Address" is a D class address (multicast address) which is assigned to the set of home agents on the Internet Service Provider (ISP) network. It is recommended for mobile nodes to use this address to access home agents instead of subnet-directed broadcast address for efficiency reasons.

Computer networks and Internet links have been existence for several years. Also, wireless access and communications to these networks and to the Internet have also been in use. However, current protocols that use present dynamic home agent discovery algorithms and systems to handle and deal with communications of mobile computers to the Internet and network, such as base mobile IP, result in various problems and shortcomings.

These present protocols that use dynamic home agent discovery algorithms and systems inefficiently use wireless access and communication resources and network resources. For example, prior art FIGS. 2 and 3 show a mobile computer 10 with a mobile node 11 that communicates (through the Internet 14 having a relatively low bandwidth) with a home network 12 having a relatively large or infinite bandwidth.

One inefficiency problem with present protocols that use dynamic home agent discovery algorithms or systems stems from the fact that agent advertisement must be used by the protocol in order to detect motion and location of a mobile node 11. Prior art FIG. 2 shows mobility agents, such as home agents 16 or foreign agents, advertising their presence to a mobile node(s) 11 via agent advertisement messages. Each and every home agent 16 advertises its presence to the mobile node 11 as shown in FIG. 2. In this example, wireless networks have a set of RF channels, which is used for communication between hosts (i.e. home agents 16) and mobile nodes 11. When a host (i.e. home agents 16) wants to send a packet to a mobile node 11, the mobile node 11 is allocated one of these RF channels. Packet communication between the host (i.e. home agents 16) and the mobile node 11 commences once one of the RF channels is allocated. Many other mobile nodes 11 would also be-allocated various RF channels. If multiple home agents 16 are periodically sending agent advertisement messages, where the period between transmission, for example, is one (1) second, then low optimization of the RF bandwidth would result causing inefficient use of scarce wireless access and communication resources. A similar inefficiency problem with use of network bandwidth also exists on the network side. Thus, inefficient usage of wireless network resources, such as the use of RF channels, results from the present home dynamic home agent discovery algorithms and systems if multiple home agents send agent advertisement messages.

Another inefficiency problem with current protocols that use dynamic home agent discovery algorithms involves the mobile node 11 having to register and the home agents 16 having to reply to the registration requests. The mobile node 11 registers directly with its home agent 16. However, the mobile node 11 may not know the IP address of its home agent 16, and the mobile node 11 then uses the dynamic home agent discovery algorithms to automatically determine the IP address of its home agent 16. In this case, as shown in prior art FIG. 3, the mobile node 11 must send a home agent discovery request to each home agent 16 wherein the mobile node 11 sets the home agent subnet-directed broadcast address of the mobile node's home network 12 and sends the home agent discovery request to each home agent 16. All of the home agents 16 receiving the home agent discovery request must reply as shown in prior art FIG. 3. If the mobile node 11 does not have a registered home agent 16, then the mobile node 11 must select and register with a home agent 16. Each home agent 16 already having a broadcast destination address must reject the mobile node's registration request and return a rejection registration reply indicating its unicast IP address for use by the mobile node 11 in future registration attempts. The receipt by the mobile node 11 of all of the replies from the home agents 16 results in execution time inefficiencies, more complex processing, and improper utilization of radio frequency (RF) and network bandwidth.

A further problem relates to when a home agent 16 fails. If a home agent 16 fails, then a back up home agent 16 to take over the operations of the failed home agent 16 in servicing the respectively registered mobile node(s) 11 presently does not exist. Therefore, if a home agent 16 fails, then inconvenience and loss of service to the mobile node(s) 11 results. Also, if a home agent 16 fails, then time-consuming recovery operations need to be implemented or loss of operation and service by the home agent 16 (no way of recovery from failure or error) results. A system and method for recovering from such a failure or error of a home agent 16 or a backup system for such a failure or error occurrence presently do not exist.

It would therefore be advantageous and desirable to provide a protocol that has a more efficient and improved dynamic home agent discovery algorithm and system that overcomes the problems and disadvantages of the prior art algorithms. The efficient dynamic home agent discovery algorithm and system allows the implementation of a protocol that is more efficient in using the wireless access, communications resources, and the network resources, and that is more efficient in identifying home agent failures or errors and in recovering from these failures or errors.

SUMMARY OF THE INVENTION

It is therefore one object of the present invention to provide an efficient and improved dynamic home agent discovery algorithm and system to be used in a protocol for Internet or network communications.

It is another object of the present invention to provide a protocol that has a more efficient and improved dynamic home agent discovery algorithm and system which overcomes the problems and disadvantages of the prior art algorithms.

It is a further object of the present invention to provide an efficient and improved dynamic home agent discovery algorithm and system for a protocol that is more efficient in using the wireless access, communications resources, and the network resources.

It is still a further object of the present invention to provide an efficient and improved dynamic home agent discovery algorithm and system that provide a way of recovering from a failure or error that occurs at a home agent or a backup system and method that is able to be implemented when a failure or error has occurred at a home agent to provide recovery or backup home agent services to the mobile node(s) in the event of a failure or error occurrence.

The foregoing objects are achieved as is now described. The present invention is an efficient and improved dynamic home agent discovery algorithm and system to be used in a protocol for Internet or network communications. The present efficient and improved dynamic home agent discovery algorithm and system for a protocol more efficiently uses the wireless access, communications resources, and the network resources. If a failure or error occurs at a home agent, the efficient and improved dynamic home agent discovery algorithm and system provide recovery or backup home agent services to the mobile node(s) associated or coupled to the failed home agent. The efficient dynamic home agent discovery algorithm and system encapsulate and integrate communications of the home agents into a single home agent communication. Communication between the mobile node and the home agents is simplified to a single home agent communication. Dynamic home agent discovery processes are performed based on the single home agent communication. Encapsulation is achieved by having each of the home agents maintain a home agent list that contains information about each of the home agents coupled to the home link. Heart beat messages are used to communicate the information between each of the home agents. A designated home agent for the home agents receives and processes a single home agent discovery request from the mobile node, and a designated home agent for the home agents sends home agent advertisement and communicates and processes a single home agent discovery request to the mobile node.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is an efficient and improved dynamic home agent discovery algorithm and system to be used in a protocol for Internet or network communications. The present efficient and improved dynamic home agent discovery algorithm and system for a protocol more efficiently uses the wireless access, communications resources, and the network resources. If a failure or error occurs at a home agent 16, the efficient and improved dynamic home agent discovery algorithm and system provide recovery or backup home agent services to the mobile node(s) 11 associated or coupled to the failed home agent 16.

Figure 4:
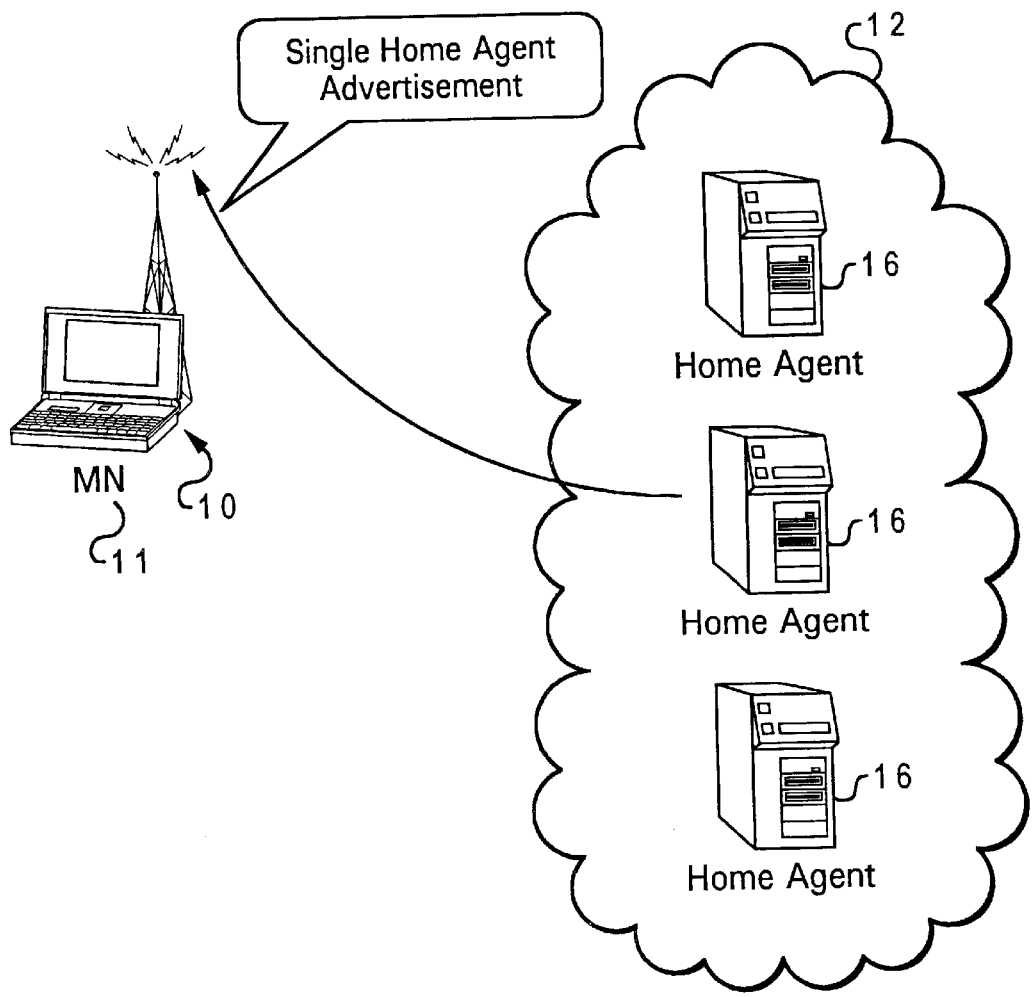
FIG. 4 is a diagram showing the home agent advertisement process, for home agents used in a protocol that implements the present invention efficient dynamic home agent discovery algorithm and system.
Figure 5:
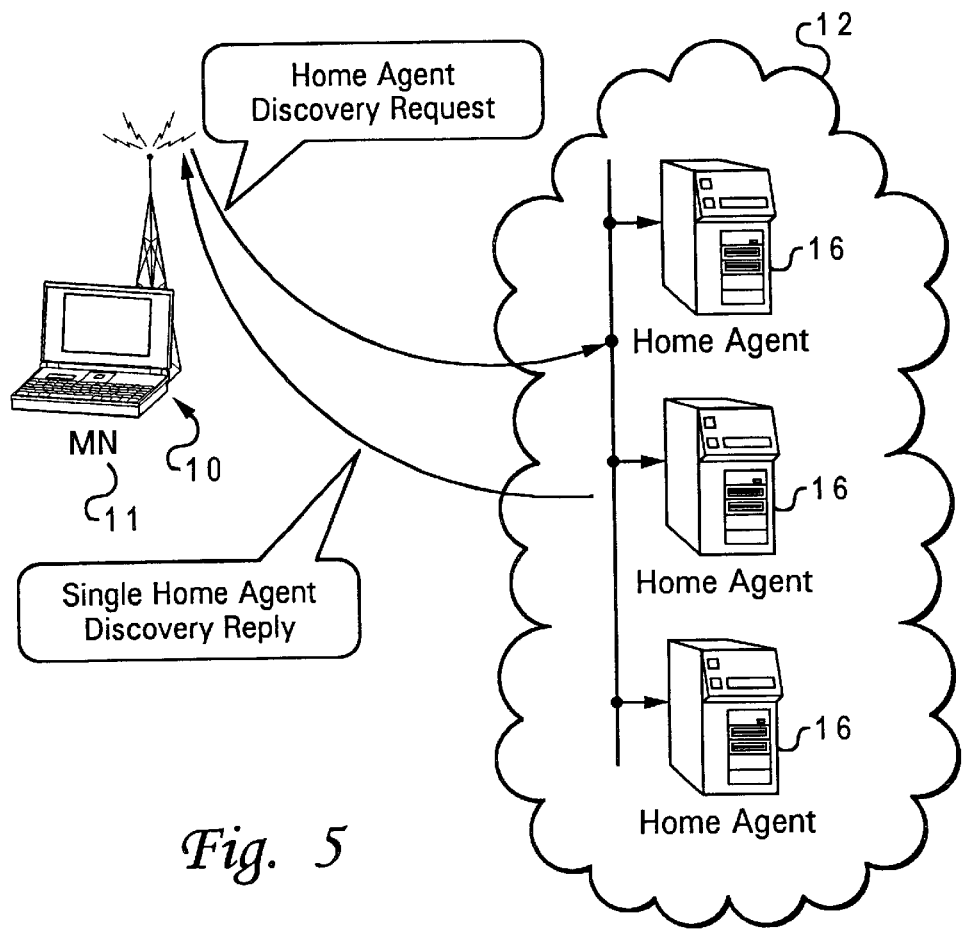
FIG. 5 is a diagram showing the home agent discovery request and reply processes for a mobile node used in a protocol that implements the present invention efficient dynamic home agent discovery algorithm and system.

With reference now to the figures and in particular with reference to FIGS. 4 and 5, the present invention efficient dynamic home agent discovery algorithm and system simplify communication between the mobile node 11 and the home agents 16 generally to a single communication. The present invention efficient dynamic home agent discovery algorithm and system involve having the home agents 16 communicate to each other through internal or heart beat messages 29 and having each home agent 16 maintain a home agent list 24, which will be discussed later in this specification.

Figure 1:
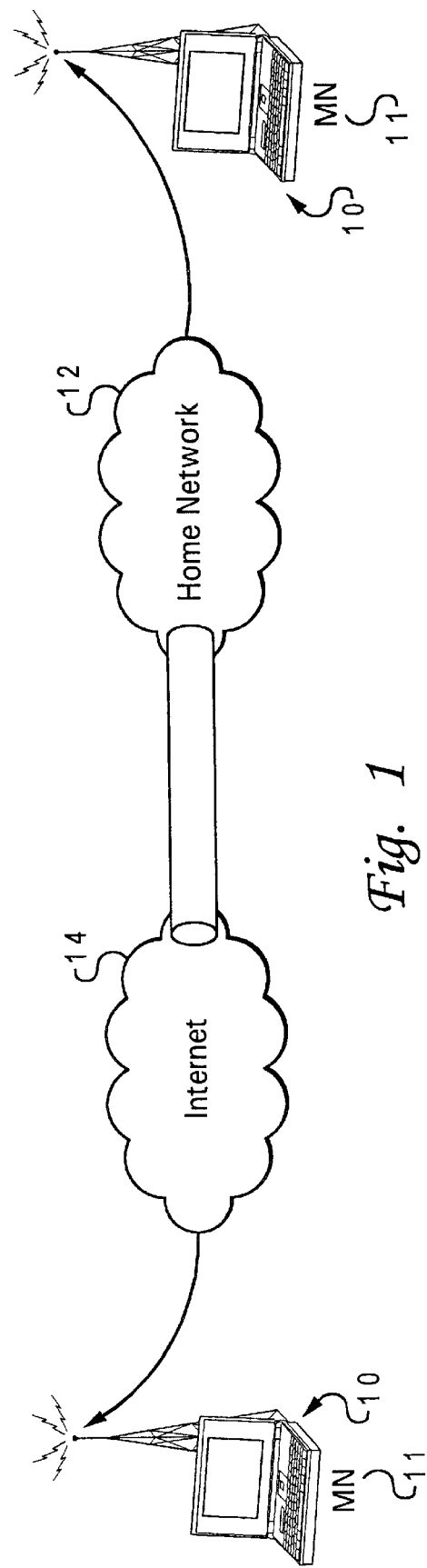
FIG. 1 is a prior art diagram showing an overall configuration of a mobile computer that is able to move from one location to another location and that communicates over the Internet and a home network with other systems or devices wherein the configuration requires the use of a protocol that uses a dynamic home agent discovery algorithm or system for such communication.
Figure 2:
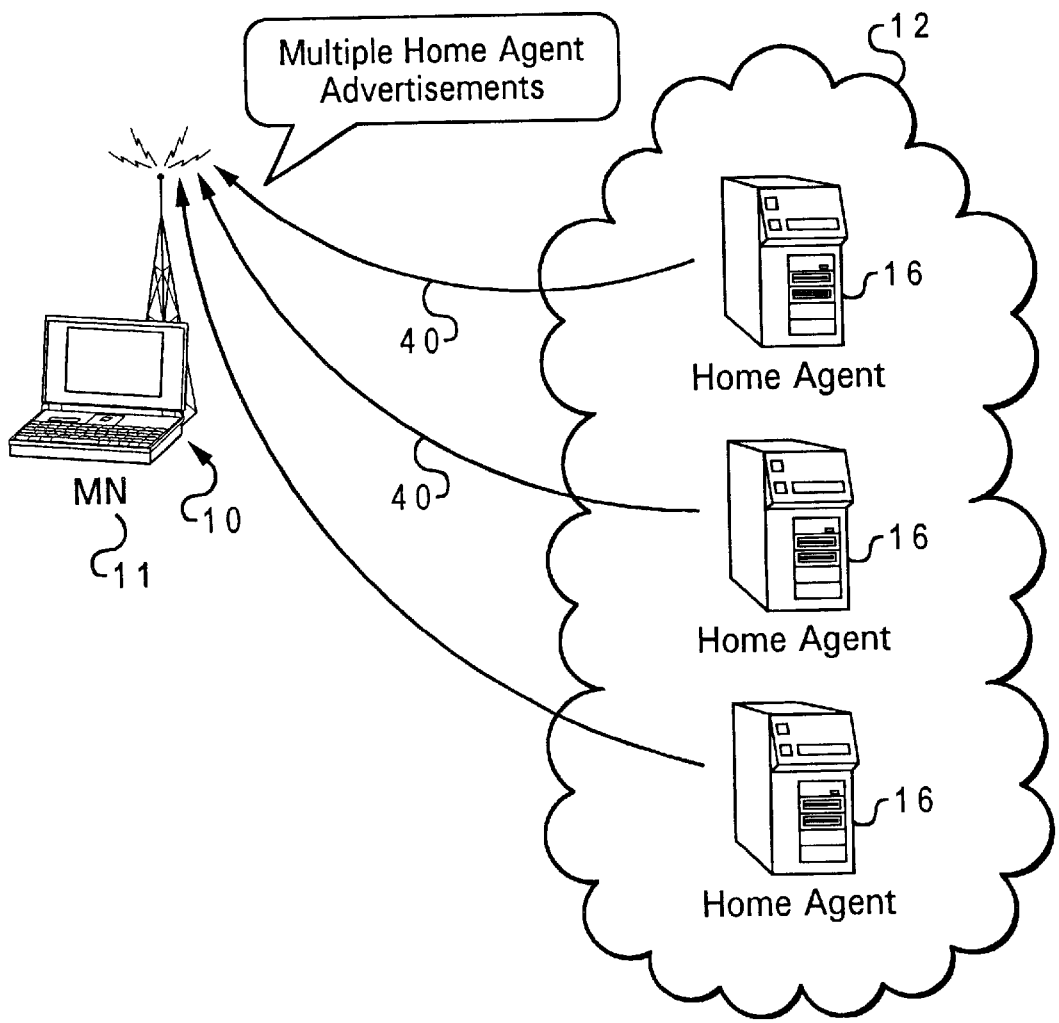
FIG. 2 is a prior art diagram showing the home agent advertisement process for home agents wherein this advertisement process is implemented by a dynamic home agent discovery algorithm or system for a computer protocol.

If multiple home agents 16 exist on the home link for the home network 12, a possibility of multiple home agents 16 sending agent advertisements within the same agent advertisement lifetime period exists as shown in FIG. 2. The present efficient dynamic home agent discovery algorithm and system simplify the sending of agent advertisements from home agents 16 to the mobile node 11 to a single home agent advertisement communication. With reference now to the figures and in particular with reference to FIG. 4, a single home agent 16 is designated to send agent advertisements on behalf of the home agents 16 since the home agents 16 communicate with each other and each home agent 16 maintains a list 24 regarding all of the home agents 16 coupled to a home link for the home network 12. Therefore, the present efficient dynamic home agent discovery algorithm and system are implemented so that only a single home agent advertisement message is sent from the home network 12 and to the mobile node 11 as shown in FIG. 4 in contrast to the prior art algorithms and systems that are implemented which require each and every home agent 16 in the home network 12 to send a home agent advertisement message to the mobile node 11 as shown in FIG. 2.

Figure 3:
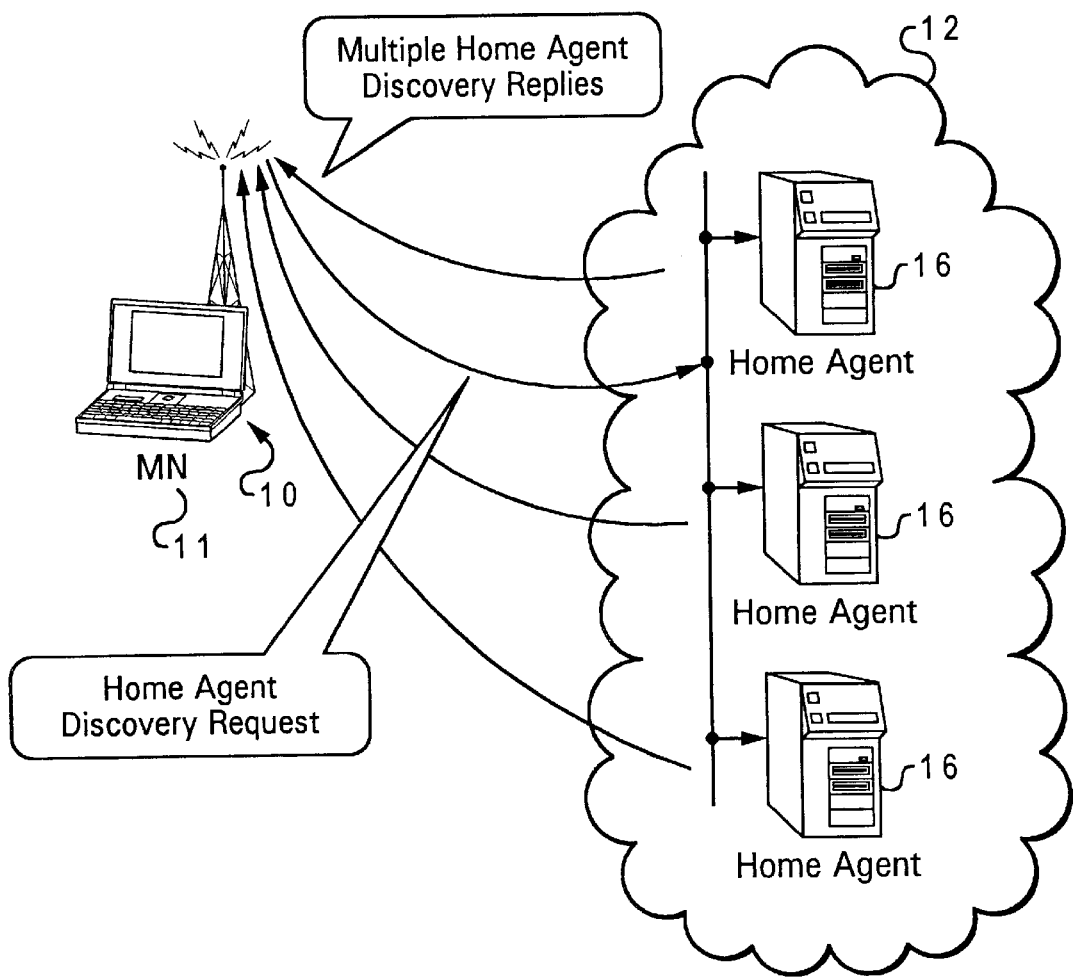
FIG. 3 is a prior art diagram showing the home agent discovery request and reply processes for a mobile node wherein these processes are implemented by a dynamic home agent discovery algorithm or system for a computer protocol.

FIG. 3 shows that the mobile node 11 must send a home agent discovery request to each home agent 16 wherein the mobile node 11 sets the home agent subnet-directed broadcast address of the mobile node's home network 12 and sends the home agent discovery request to each home agent 16. The present efficient dynamic home agent discovery algorithm and system lets all of the home agents 16 receive the discovery request from the mobile node 11 through the broadcast message from the mobile node 11, but the algorithm and system simplify the reply from the home agents 16 by having only one home agent 16 process the request on behalf of the home network 12. With reference now to the figures and in particular with reference to FIG. 5, a single home agent 16 is designated to receive and process the single home agent discovery or registration request from the mobile node 11 for itself and on behalf of the other home agents 16 since the home agents 16 communicate with each other and each home agent 16 maintains information and a list 24 regarding the other home agents 16. Therefore, the present efficient dynamic home agent discovery algorithm and system are implemented so that only a single home agent discovery or registration processes and replies to the request from the mobile node 11 for the home agents 16 as shown in FIG. 5 in contrast to the prior art algorithms and systems that are implemented which require each and every home agent 16 in the home network 12 to process and reply to the home agent discovery request as shown in FIG. 3.

Therefore, the present efficient dynamic home agent discovery algorithm and system have a single home agent 16 send advertisements for itself and for the other home agents 16. The mobile node 11 broadcasts a registration request communication to the home agents 16, including a designated home agent 16, and the designated home agent 16 for itself and for the other home agents 16 processes and sends a single registration reply communication to the mobile node 11. If a selected or designated home agent 16 fails, then another home agent 16 is selected or designated and takes over the operations of the failed home agent 16.

Each home agent 16 collects information about the other home agents 16 or its neighboring home agents 16, but only one home agent 16 responds to the dynamic home agent discovery request. With reference now to the figures and in particular with reference to FIG. 6, the home agents 16 within the home network 12 are able to collect information by each maintaining a home agents list 24. The home agent list 24 comprises a storage array 26 that identify each of the home agents 16, a storage array 28 for indicating the life time for each of the home agents 16, and a storage array 30 for indicating the priority for selecting the respective home agent 16 as a selected or designated home agent 16.

The information (i.e. information in storage arrays 26, 28, and 30) contained in the home agent list 24 is obtained and learned from unsolicited heart beat messages 29 that are periodically sent by each home agent 16 serving on the link for the home network 12. The heart beat message 29 is a multicast message that is sent periodically by a home agent 16 to other home agents 16 in the same link for the home network 12. The message 29 contains various characteristic information of that home agent 16 to be broadcast to the other home agents 16.

Figure 7:
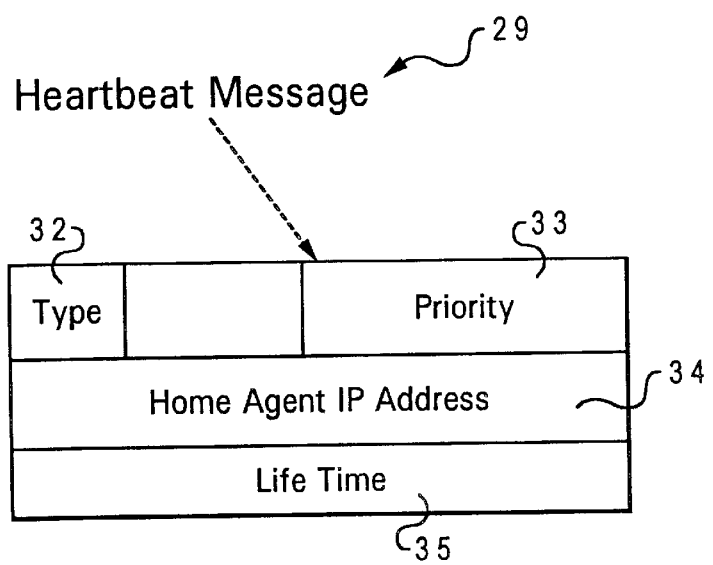
FIG. 7 is a block diagram showing the heartbeat message and the message format wherein the message is communicated between the home agents for implementing the present invention efficient home agent discovery algorithm and system.
Figure 8:
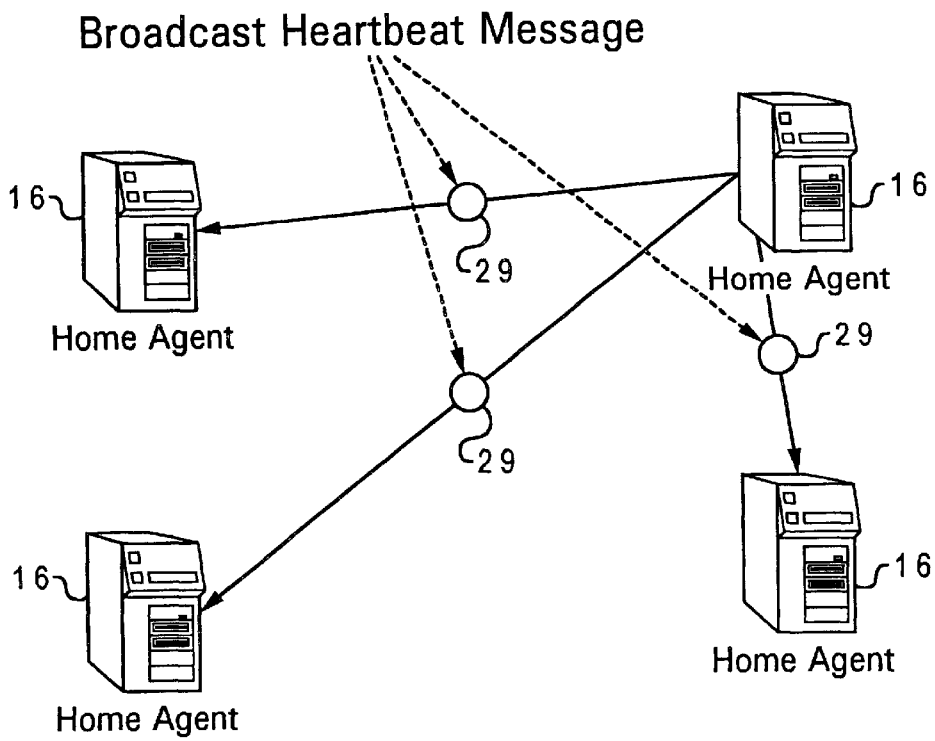
FIG. 8 is a diagram showing broadcasting of heartbeat messages among the home agents.

The heart beat message 29 carries information about the home agent 16 that is transmitting or sending information. FIG. 7 shows the fields of the heart beat message 29 sent or transmitted from a home agent 16 to be sent to and stored in the home agent lists 24 of other home agents 16. The fields for the heart beat message 29 include a type field 32, a priority field 33, a home agent IP address field 34, and a life time field 35. The type field 32 identifies the type of heart beat message 29 for the sending/transmitting home agent 16. The priority field 33 indicates the priority selection for that home agent 16. The home agent IP address field 34 contains the home agent IP address for the home agent 16. The life time field 35 identifies the life time of the home agent 16. FIG. 8 shows a home agent 16 that is broadcasting heart beat messages 29 to each of the other home agents 16.

Figure 9:
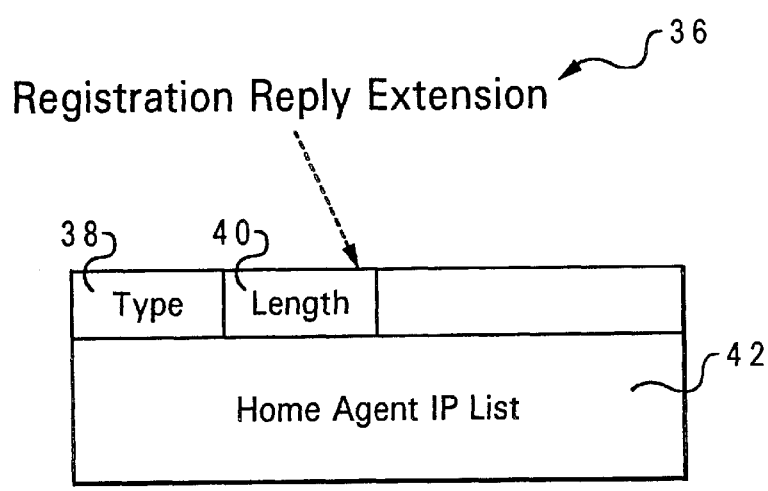
FIG. 9 is a block diagram of the registration reply extension used by home agents for the present invention efficient home agent discovery algorithm and system.

The selected or designated home agent 16 sends the home agent discovery reply on behalf of itself and the other home agents 16 in the home network 12. The single home agent discovery reply contains the registration reply extension 36. The registration reply extension 36 includes the IP addresses for all neighboring home agents 16 for which the selected or designated home agent 16 sends the home agent discovery reply. FIG. 9 shows the fields of the registration reply extension 36. The registration reply extension 36 has a type field 38, a length field 40, and the home agent IP list field 42. The type field 38 identifies the type of reply message for each of the home agents 16 in the home agent list 24. The length field 40 indicates the length of each of the home agents 16 in the home agent list 24. The home agent IP list field 42 identifies and has the home agents 16 to which the designated or selected home agent 16 sends the registration reply.

Figure 6:
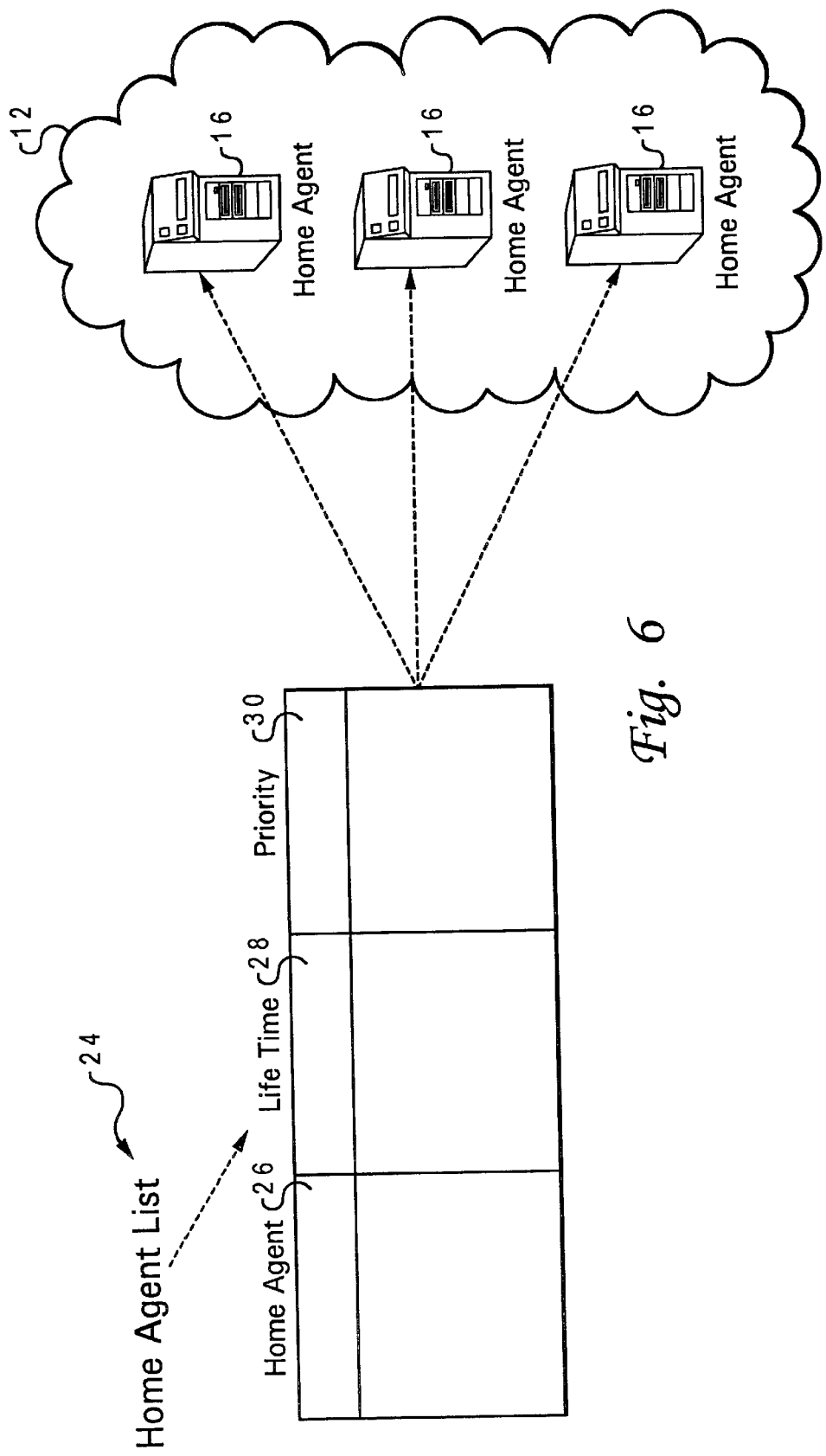
FIG. 6 is a block diagram showing the home agent list and the list format maintained by each of the home agents used in the present invention efficient dynamic home agent discovery algorithm and system.
Figure 10:
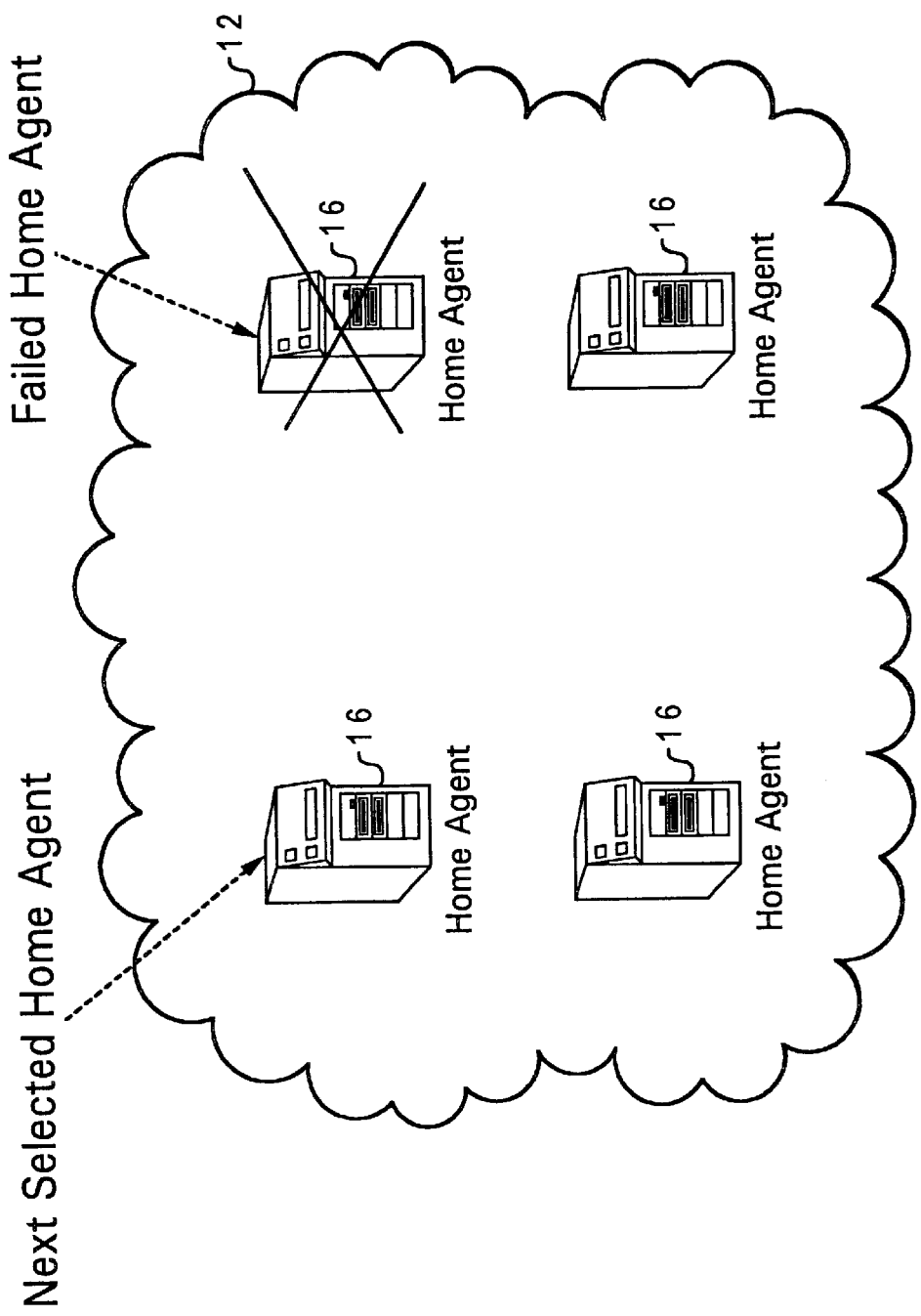
FIG. 10 is a diagram illustrating a failure/error scenario and recovery therefrom by implementing the present invention efficient home agent discovery algorithm and system for the protocol.

With reference now to the figures and in particular with reference to FIG. 10, the present efficient dynamic home agent discovery algorithm and system allow another home agent 16 to be selected or designated according to a home agent priority if the selected or designated home agent 16 has failed. The priority is indicated in the home agent list 24 as shown in FIG. 6. The newly selected or designated home agent 16 becomes responsible for agent advertising for itself and for the other home agents 16 in the home network 12 (i.e. in its home agent list 24) and for answering/replying to dynamic home agent discovery requests for itself and for the other home agents 16 in the home network 12 (i.e. in its home agent list 24).

Therefore, the present invention provides an efficient dynamic home agent discovery algorithm and system to be used in a protocol for Internet or network communications. The algorithm and system allow the protocol to more efficiently use the wireless access, communications resources, and the network resources. If a failure or error occurs at a home agent, the efficient and improved dynamic home agent discovery algorithm and system provide recovery or backup home agent services to the mobile node(s) associated or coupled to the failed home agent. Also, the present efficient home agent discovery algorithm and system are easily adapted to present home agent discovery algorithms and systems by simply implementing the home agent list, heart beat messages, and the registration reply extension.

While the invention has been particularly shown and described with reference to a preferred embodiment, it will be understood by those skilled in the art that various changes in form and detail may be made therein without departing from the spirit and scope of the invention.

What is claimed is:

1. An efficient dynamic home agent discovery method for managing communications and utilization of resources between a mobile node and home agents coupled to a home link, said method comprising:

encapsulating and integrating communications of multiple home agents into a single home agent communication, generating a list of one or more available home agents, integrating into the single home agent communication the list of the available home agents, communicating the single home agent communication to a mobile node so that the mobile node can select a home agent from the list of available home agents.

2. The method of claim 1, wherein the generating step further comprises:

one or more of the home agents maintaining the list of the available home agents, said list containing one or more items of information about one or more of the available home agents, wherein the one or more items of information include at least one of an Internet Protocol address of the home agent, a remaining lifetime relating to the home agents, and one or more items of priority information relating to the home agent.

3. The method of claim 1, wherein the generating step further comprises:

transmitting one or more heart beat messages between the multiple home agents.

4. The method of claim 1, further comprising:

performing the encapsulating, integrating, and communicating steps with a single server.

5. The method of claim 3, wherein the one or more heart beat messages further comprise: a type field for indicating a type of the home agents, a priority field for indicating a priority status of the home agent, a home agent Internet Protocol address field for indicating a home agent Internet Protocol address of the home agent, and a life time field for indicating a life time of the home agent.

6. The method of claim 1, said method further comprising:

selecting a designated home agent to communicate to the mobile node on behalf of the multiple home agents, and wherein said communicating step further comprises said designated home agent communicating the single home agent communication to the mobile node.

7. An efficient method for managing communication and utilization of resources between a mobile node and home agents coupled to a home link, said method comprising:

receiving an encapsulated and integrated communication from a home agent, said encapsulated and integrated communication containing a list of one or more available home agents and one or more of items of information included in the set of a type of the home agent as indicated in a type field, a priority status of the home agent as indicated in a priority status field, a home agent Internet Protocol address as indicated in a home agent Internet Protocol address field, and a life time of the home agent as indicated in a life time field, responsive to receiving the list of available home agents contained in the encapsulated and integrated communication, retrieving, from the list of one or more available home agents, one or more of said items of information, responsive to retrieving one or more of said items of information, selecting and designating for communication a home agent from the list of available home agents.

8. An efficient dynamic home agent discovery system for managing communication and utilization of resources between a mobile node and home agents coupled to a home link, said method comprising:

means for encapsulating and integrating communications of multiple home agents into a single home agent communication, means for generating a list of one or more available home agents, means for integrating into the single home agent communication the list of the available home agents, means for communicating the single home agent communication to a mobile node so that the mobile node can select a home agent from the list of available home agents.

9. The system of claim 8, wherein the generating means further comprise:

means for one or more of the home agents maintaining the list of the available home agents, said list containing means for one or more items of information about one or more of the available home agents, wherein the one or more items of information include means for at least one of an Internet Protocol address of the home agent, means for a remaining lifetime relating to the home agent, and means for one or more items of priority information relating to the home agent.

10. The system of claim 8, wherein the generating means further comprise:

means for transmitting one or more heart beat messages between the multiple home agents.

11. The system of claim 8, further comprising:

means for performing the encapsulating, integrating, and communicating steps with a single server.

12. The system of claim 10, wherein the means for transmitting one or more heart beat messages further comprise: means for a type field for indicating a type of the home agent, means for a priority field for indicating a priority status of the home agent, means for a home agent Internet Protocol address field for indicating a home agent Internet Protocol address of the home agent, and means for a life time field for indicating a life time of the home agent.

13. The system of claim 8, said method further comprising:

means for selecting a designated home agent to communicate to the mobile node on behalf of the multiple home agents, and wherein said communicating means further comprise means for said designated home agent communicating the single home agent communication to the mobile node.

14. An efficient system for managing communication and utilization of resources between a mobile node and home agents coupled to a home line, said system comprising:

means for receiving an encapsulated and integrated communication from a home agent, said encapsulated and integrated communication containing a list of one or more available home agents and one or more of items of information included in the set of a type of the home agent as indicated in a type field, a priority status of the home agent as indicated in a priority status field, a home agent Internet Protocol address as indicated in a home agent Internet Protocol address field, and a life time of the home agent as indicated in a life time field, means for, responsive to receiving the list of available home agents contained in the encapsulated and integrated communication, retrieving, from the list of one or more available home agents, one or more of said items of information, means for, responsive to retrieving one or more of said items of information, selecting and designating for communication a home agent from the list of available home agents.

15. A computer program product in a computer readable medium for providing efficient dynamic home agent discovery for managing communication and utilization of resources between a mobile node and home agents coupled to a home link, said computer program product comprising:

instructions on the computer readable medium for encapsulating and integrating communications of multiple home agents into a single home agent communication, instructions on the computer readable medium for generating a list of one or more available home agents, instructions on the computer readable medium for integrating into the single home agent communication the list of the available home agents, instructions on the computer readable medium for communicating the single home agent communication to a mobile node so that the mobile node can select a home agent from the list of available home agents.

16. The computer program product of claim 15, wherein the generating instructions further comprise:

instructions on the computer readable medium for one or more of the home agents maintaining the list of the available home agents, said list containing one or more items of information about one or more of the available home agents, wherein the one or more items of information include at least one of an Internet Protocol address of the home agents, a remaining lifetime relating to the home agent, and one or more items of priority information relating to the home agent.

17. The computer program product in a computer readable medium of claim 15, wherein the generating instructions further comprises:

instructions on the computer readable medium for transmitting one or more heart beat messages between the multiple home agents.

18. The computer program product in a computer readable medium of claim 15, further comprising:

instructions on the computer readable medium for performing the encapsulating, integrating, and communicating steps with a single server.

19. The computer program product in a computer readable medium of claim 17, wherein instructions on the computer readable medium for transmitting one or more heart beat messages further comprise: instructions on the computer readable medium for generating a type field for indicating a type of the home agent, a priority field for indicating a priority status of the home agent, a home agent Internet Protocol address field for indicating a home agent Internet Protocol address of the home agent, and a life time field for indicating a life time of the home agent.

20. The computer program product in a computer readable medium of claim 15, said computer program product further comprising:

instructions on the computer readable medium for selecting a designated home agent to communicate to the mobile node on behalf of the multiple home agents, and wherein said instructions on the computer readable medium further comprise instructions for said designated home agent communicating the single home agent communication to the mobile node.

21. A computer program product in a computer readable medium for efficient management of communication and utilization of resources between a mobile node and home agents coupled to a home line, said method comprising:

instructions on the computer readable medium for receiving an encapsulated and integrated communication from a home agent, said encapsulated and integrated communication containing a list of one or more available home agents and one or more of items of information included in the set of a type of the home agent as indicated in a type field, a priority status of the home agent as indicated in a priority status field, a home agent Internet Protocol address as indicated in a home agent Internet Protocol address field, and a life time of the home agent as indicated in a life time field, instructions on the computer readable medium for, responsive to receiving the list of available home agents contained in the encapsulated and integrated communication, retrieving, from the list of one or more available home agents, one or more of said items of information, instructions on the computer readable medium for, responsive to retrieving one or more of said items of information, selecting and designating for communication a home agent from the list of available home agents.

* * * * *